Figure 1:
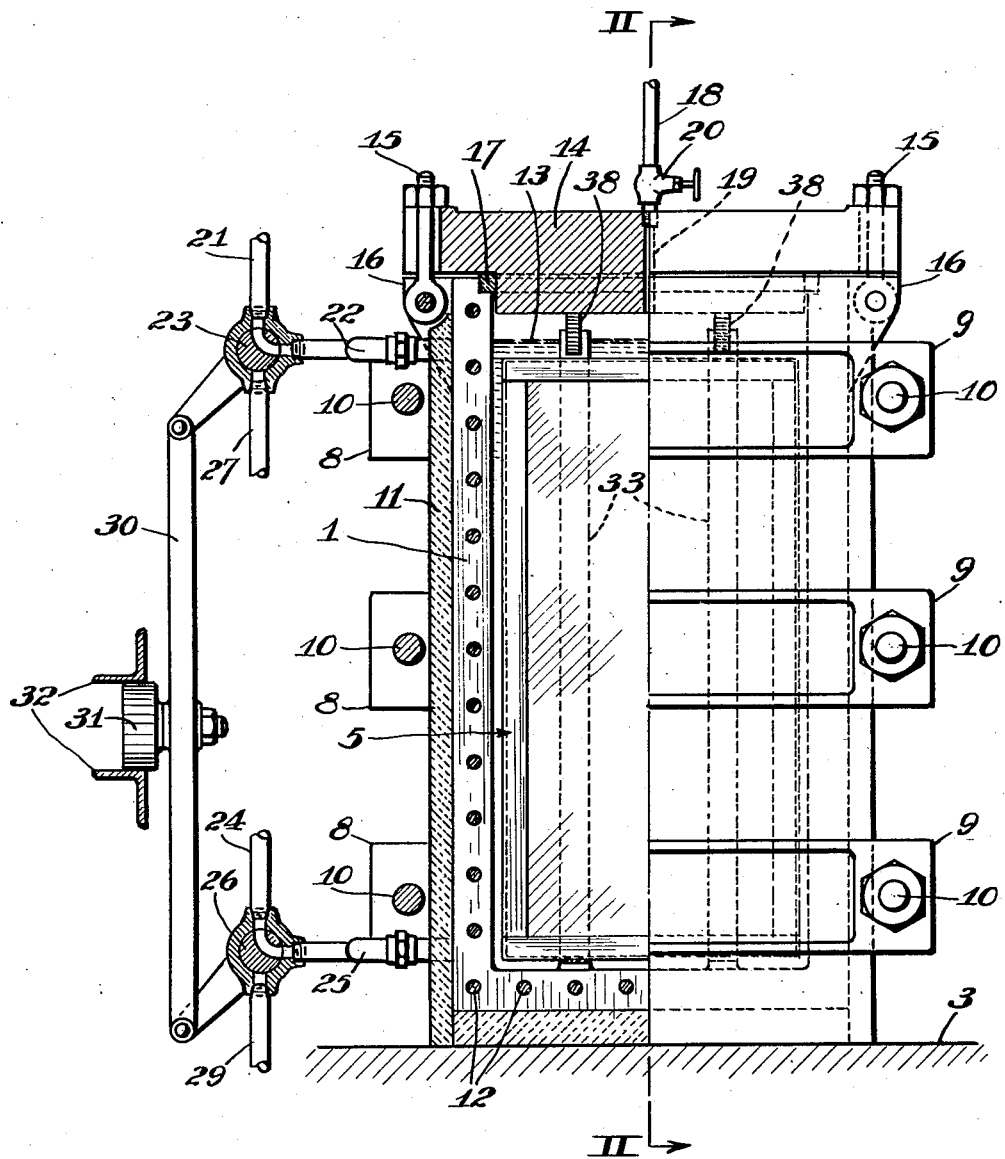

Aug. 18, 1931.  N. J. PENNING  1,819,336
PROCESS AND APPARATUS FOR MAKING COMPOSITE GLASS
Filed Feb. 21, 1929   3 Sheets-Sheet 1

Aug. 18, 1931.  N. J. PENNING  1,819,336

PROCESS AND APPARATUS FOR MAKING COMPOSITE GLASS

Filed Feb. 21, 1929   3 Sheets-Sheet 2

INVENTOR
Nicholas J. Penning
by
James C. Bradley
att.

Aug. 18, 1931.    N. J. PENNING    1,819,336
PROCESS AND APPARATUS FOR MAKING COMPOSITE GLASS
Filed Feb. 21, 1929    3 Sheets-Sheet 3
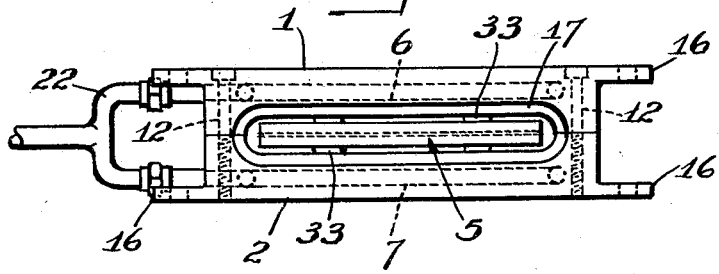
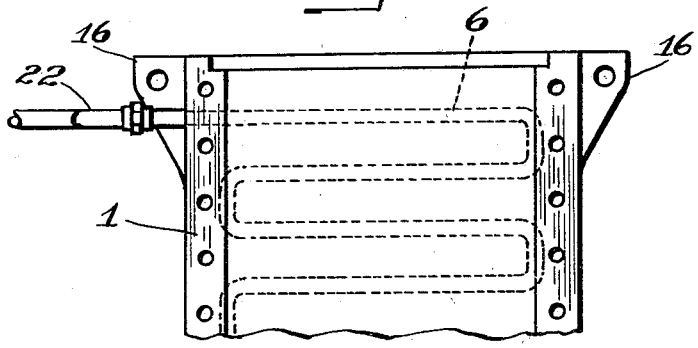
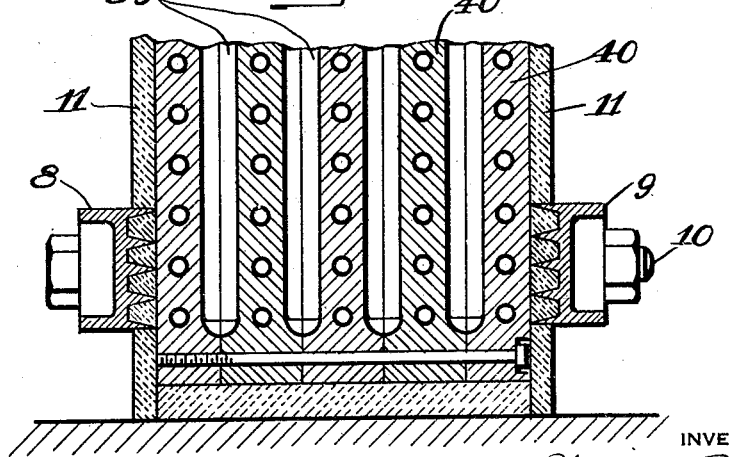

Patented Aug. 18, 1931

1,819,336

UNITED STATES PATENT OFFICE

NICHOLAS J. PENNING, OF PITTSBURGH, PENNSYLVANIA, ASSIGNOR TO DUPLATE CORPORATION, A CORPORATION OF DELAWARE

PROCESS AND APPARATUS FOR MAKING COMPOSITE GLASS

Application filed February 21, 1929. Serial No. 341,643.

Figure 2:
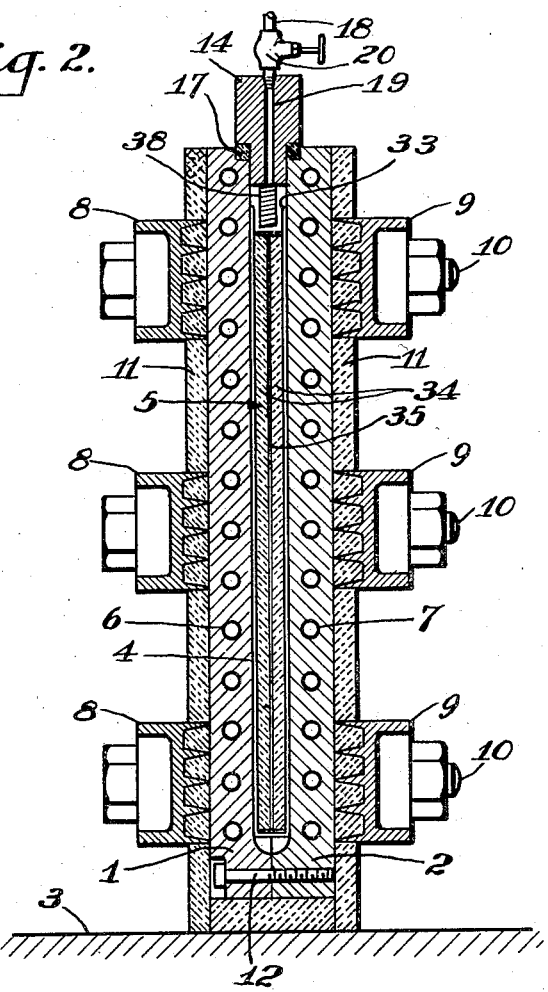
Figure 6:
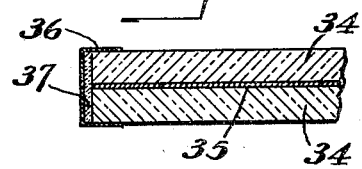
Figure 5:
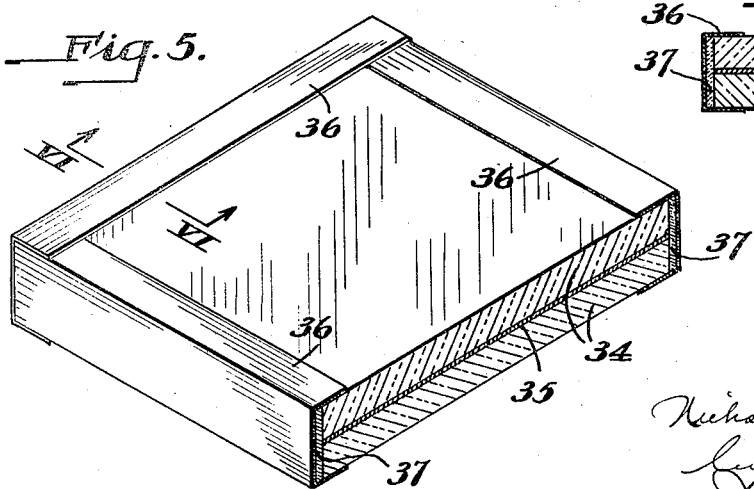

The invention relates to a process and apparatus for making composite glass, wherein heat and pressure are applied to cause a joinder between the glass and the reinforcing material, preferably pyroxylin plastic, such as pyralin or celluloid. Composite glass ordinarily comprises two sheets of glass with the sheet of pyralin, celluloid or equivalent material cemented therebetween, although a greater number of sheets may be employed. It is the practice to assemble the sheets with a coating of cement, such as gelatin, dried upon the surfaces of the glass sheets which are to be cemented to the pyralin or celluloid, heat being subsequently applied to soften the gelatin and secure adhesion, at which time pressure is applied. Heretofore one of the most successful commercial methods employed has been to place the sheets to be composited in a rubber bag from which the air is exhausted, after which the bag is placed in a pressure chamber to which water under pressure is supplied, such water being brought up to the desired temperature for softening the cement during the pressing operation. The temperature of the water is then reduced, while the pressure in the chamber is maintained, so that the composited sheets are cooled under pressure. This method of compositing involves a relatively high labor cost incident to the placing of the glass in the bags, the sealing of the bags and the unsealing of the bags and the removal of the glass therefrom. It is also wasteful because of the large heat losses incident to first heating the water in the pressure chamber and then cooling it. The present invention has for its objects the improvement of the process above described, both in the matter of labor and the cost of heating. By its use the requirement for the rubber bags heretofore employed is avoided, the period of the heating and cooling cycle is reduced, and at the same time all the advantages incident to the old process are retained. A further advantage secured by the use of a process and apparatus of the present invention is the avoidance in a large measure of the thinning of the celluloid or pyralin at the edges of the sheet during the pressing operation, such as is characteristic of the rubber bag method. The method and apparatus are illustrated in the accompanying drawings, wherein:

Figure 1 is a partial section and partial side elevation of a unit embodying the invention. Fig. 2 is a section on the line II—II of Fig. 1. Fig. 3 is a plan view of the unit with the cover removed. Fig. 4 is a side elevation at the upper end of one section of the pressure chamber with the cover removed. Fig. 5 is a perspective view of the assembled sheets with edge securing and protecting means applied thereto. Fig. 6 is an enlarged section on the line VI—VI of Fig. 5. And Fig. 7 is a vertical section through the base of a modified form of unit having a plurality of pressing slots.

Figs. 1 and 2 illustrate only a single compositing unit, it being understood, however, that in practice, a large number of units may be used upon a rotating table, as shown in the patent to W. O. Lytle No. 1,698,371 and that the actuation of the various valves employed in controlling heat and pressure may be made automatic in timed relation with the rotation of the table.

The unit, as shown in Figs. 1 and 2, comprises a pair of cast platens 1 and 2 seated upon the base 3 (which may be the floor of a rotating table) with a slot or chamber 4 therebetween, which slot or chamber is designed to receive the set of sheets 5 which are to be composited. The platens are preferably of cast iron with the pipes 6 and 7 embedded in the cast metal, so as to provide heating and cooling passages, as hereinafter described. The two platens have ground surfaces at their line of contact in order to make a fluid-tight joint, and are secured together by the pairs of clamping bars 8 and 9 clamped together at their ends by the bolts 10. In order to prevent an undue loss of heat, the outer faces of the platens are covered with layers 11, 11 of insulating material, such as asbestos, clamped in position by the bars 8 and 9. Additional clamping means are also provided at the edges of the platens in the form of the bolts 12.

The slot or chamber 4 is partially filled with a bath of mercury 13, whose level, as indicated in Fig. 1, lies above the top of the sheets 5, when such sheets are forced down into the bath. The slot or chamber is made relatively narrow, in order to reduce the body of mercury to a minimum, and secure a corresponding reduction in the time required to heat the mercury and the sheets 5 carried therein to the temperature required for the pressing operation. The top of the slot or chamber is closed by means of the cover 14 secured in place by the bolts 15 pivoted to the lugs 16 (Fig. 4) at the tops of the platens and working in slots in the ends of the cover, a packing strip 17 being provided in order to secure a tight joint.

Pressure is supplied to the chamber 4 by means of an air pipe 18 connected to the passage 19 through the cover and provided with a valve 20.

Steam is supplied to the pipes 6 and 7 to heat the platens from the pipe 21, which pipe is connected to the upper ends of the pipes 6 and 7 by the Y connection 22. A two-way valve 23 governs the flow from the pipe 21. Similarly the lower ends of the pipes 6 and 7 are connected to the outlet steam pipe 24 by the Y connection 25, in which is located the two-way valve 26. A cooling medium, such as water, is supplied to the upper ends of the pipes 6 and 7 from the pipe 27, which is also connected to the casing of the valve 23, a movement of such valve 90 degrees in a clockwise direction, serving to cut off the supply of steam and connect the pipe 27 with the pipes 6 and 7. Similarly, an outlet pipe 29 for the water is connected to the casing of the valve 26, and the handles of the valves 23 and 26 are connected by the bar 30 so that when the valve 23 is rotated 90 degrees, as above described, the valve 26 is similarly rotated and the lower ends of the pipes 6 and 7 are connected to the pipe 29. The bar 30 is shown as provided with a roller 31 engaging a pair of cam rails 32, so that the valves may be operated by the movement of the table upon which the unit is mounted, although this bar may be operated in any desired way, such as by hand, in case the unit is mounted on a fixed case.

A pair of strips 33, 33 of woven fabric (Fig. 1) looped around the set of sheets, are used in handling them and also serve as spacers to prevent the outer surfaces of the glass sheets from contacting with the faces of the platens 1 and 2, or pieces of rope may be used for this purpose, it being desirable that such means or other suitable means, shall be used to center the sheets in the slot or chamber and prevent them from contacting with the platens.

In operation, the sheets of glass 34, 34 are assembled as indicated in Figs. 5 and 6 with a sheet 35 of reinforcing material, such as pyralin, therebetween, the inner faces of the glass sheets having been coated with a thin layer of cement, such as gelatin. To hold the sheets securely in assembled relation, strips 36 of gummed paper are preferably placed around the edges of the sheets. These strips are preferably provided at their central portions with strips of absorbent material 37, such as blotting paper, which permits a free outflow, during the pressing operation, of any air trapped between the sheets. The strips of paper prevent the application of fluid pressure to the joints between the sheets during the pressing operation, but are not essential in this connection, since the liquid to which they are exposed (mercury) does not wet the sheets, as does water or other liquids heretofore used in similar pressing operations, and there is, therefore, no tendency of the liquid to work into the joints due to capillary action. The assembled sheets, with the spacing loops 33 applied thereto, are now inserted into the slot 4 and pressed down into the mercury to the position shown in Figs. 1 and 2, the level of the mercury at such time lying above the upper edges of the sheets. The sheets may be held in submerged position by a pair of coil springs 38 (Fig. 1) or other suitable means interposed between the edges of the sheets and the lower face of the cover 14. The pressure of the mercury during this operation is applied to the sheets progressively beginning at the lower portions thereof, so that any air trapped between the sheets is pressed upward and expelled as the sheets move down. The cover 14 is now applied and the sheets are ready for the application of the necessary heat and pressure. Pressure is applied by opening the valve 20, so that the desired pressure, ordinarily in the neighborhood of 150 pounds per square inch, is applied to the space above the bath of mercury. Since the mercury will not flow into the joints between the sheets, even when the use of the protecting strips is dispensed with, there is no tendency of the liquid pressure at the edges of the sheets to offset or neutralize the effect of the pressure of the mercury on the sides of the sheets, so that such sheets are pressed together with the same force per square inch as that supplied from the air line. At the same time air pressure is applied, the valves 23 and 26 are moved to the positions shown in Fig. 1, so that there is a circulation of steam through the passages of the platens 1 and 2. The heat of the platens is immediately transmitted by the thin bodies of mercury to the sheets, and such sheets are brought to a temperature of from 235 to 250 degrees F., thus bringing the gelatin cement to an adhesive condition and softening the pyralin slightly. As soon as the proper temperature condition is secured, the valves 23 and 26 are shifted 90 degrees in a clockwise direction, thus cutting off the flow of steam through the platens and substituting a flow of cooling water. When the sheets are reduced to a temperature for convenient handling, the valves 23 and 26 are rotated in either direction just enough to bring them to cut-off position, and the air valve 20 is closed. Upon removing the cover 14 the composite sheet is readily removed, such removal being facilitated by the upward pressure of the mercury and by the use of the spacing loops 33, 33. A new set of sheets is inserted into the slot or chamber and the cycle repeated.

The cycle of operations as above described can be carried through in a fraction of the time required in the rubber bag operation, heretofore described, and at a fraction of the cost required for heating and cooling required by such other operation. This having is due to the direct contact of the mercury with the glass; to the small volume of mercury which requires heating and cooling; and to the high conductivity of the mercury as compared with water. The operation as a whole also involves a saving in time and labor, as compared with the rubber bag process, due to the fact that the labor of putting the sheets into bags, exhausting the air from the bags, and removing the sheets from the bags, is avoided. The cost and maintenance of the bags is a very large item of expense connected with the old method of procedure which is avoided in the present method.

Fig. 7 illustrates a modification in that the unit comprises a plurality of chambers 39, 39, etc. This involves an economy in construction and operation, as the amount of insulation is reduced, as well as the heat losses, and only five platens 40, 40, etc. are required for the four slots or chambers 39, 39, etc., whereas eight would be required for four slots or chambers if the construction of Figs. 1 and 2 were followed. The labor involved in handling the closure is also reduced as once cover can be employed for all four slots. The construction in other particulars parallels that of Figs. 1 and 2. Although mercury is the preferred liquid used in the operation, it is possible to use other fluid compositions having the same non-wetting property, as for instance, any of the alloys having very low melting points. The use of such alloys, however, increases the danger of breakage incident to the relatively high temperature at which they must be maintained and greatly increases the difficulty of practicing the method.

What I claim is:

1. A process of making a composite glass plate, which consists in assembling alternating sheets of glass and tough reinforcing material having their opposing surfaces prepared so as to become attached together upon the application of heat and pressure and submerging the assembled sheets in a bath of hot mercury under pressure.

2. A process of making a composite glass plate, which consists in assembling alternating sheets of glass and tough reinforcing material having their opposing surfaces prepared so as to become attached together upon the application of heat and pressure, placing the assembled sheets in a mercury bath, applying pressure to the mercury and alternately heating and cooling it while maintaining it in a quiescent condition.

3. A process of making a composite glass plate, which consists in assembling alternating sheets of glass and tough reinforcing material having their opposing surfaces prepared so as to become attached together upon the application of heat and pressure, submerging the assembled sheets in a mercury bath in a pressure chamber applying fluid pressure to the chamber, and successively heating and cooling the bath by heating and cooling the walls of the chamber.

4. A process of making a composite glass plate, which consists in assembling alternating sheets of glass and tough reinforcing material having their opposing surfaces prepared so as to become attached together upon the application of heat and pressure, placing the assembled sheets in a metallic bath, and applying pressure to said bath and heating it.

5. A process of making a composite glass plate, which consists in assembling alternating sheets of glass and tough reinforcing material having their opposing surfaces prepared so as to become attached together upon the application of heat and pressure, placing the assembled sheets in a bath of liquid which is negative to capillary attraction, and applying pressure to said bath and heating it.

6. A process of making a composite glass plate, which consists in assembling alternating sheets of glass and pyroxylin plastic with a film of cement between the opposing surfaces of the sheets, placing the sheets in a mercury bath, and applying pressure to the mercury and heating it to cause the cement to soften and join the sheets into a composite plate.

7. Apparatus for making composite glass plates comprising a chamber for receiving the sheets of glass and reinforcing material to be joined together, a mercury bath in said chamber adapted to surround the assembled sheets when such sheets are placed in the bath, means for applying pressure to the bath, and means for heating the bath.

8. Apparatus for making composite glass plates comprising a chamber for receiving the sheets of glass and reinforcing material to be joined together, a mercury bath in said chamber adapted to surround the assembled sheets when such sheets are placed in the bath, means for applying pressure to the bath, and means for heating the walls of the chamber so as to heat the mercury to the desired degree.

9. Apparatus for making composite glass plates comprising a chamber for receiving the sheets of glass and reinforcing material to be joined together, a mercury bath in said chamber adapted to surround the assembled sheets when such sheets are placed in the bath, means for applying pressure to the bath, means for heating the walls of the chamber so as to heat the mercury, and means for cooling the walls of the chamber so as to cool the mercury.

10. Apparatus for making composite glass plates comprising a chamber for receiving the sheets of glass and reinforcing material to be joined together, said walls having passages for the circulation of fluid therethrough, a mercury bath in said chamber adapted to surround the assembled sheets when such sheets are placed in the bath, means for applying pressure to the bath, and means whereby heating and cooling fluid may be successively circulated through said passages.

11. Apparatus for making composite glass plates comprising a chamber for receiving the sheets of glass and reinforcing material to be joined together, a mercury bath in said chamber adapted to surround the assembled sheets when such sheets are placed in the bath, means for applying air pressure to the bath, and means for alternately heating and cooling the walls of the chamber.

12. Apparatus for making composite glass plates comprising a narrow vertical chamber having its side walls provided with passages, a mercury bath in said chamber adapted to surround the assembled sheets when such sheets are placed in the bath, means for applying pressure to the bath, and means whereby heating and cooling fluid may be successively circulated through said passages.

13. Apparatus for making composite glass plates comprising a narrow vertical chamber having its side walls provided with passages, a mercury bath in said chamber adapted to surround the assembled sheets when such sheets are placed in the chamber means for applying air pressure to the upper end of the chamber and means whereby heating and cooling fluid may be successively circulated through said passages.

14. A process of making a composite glass plate, which consists in assembling alternating sheets of glass and tough reinforcing material having their opposing surfaces prepared so as to become attached together upon the application of heat and pressure, applying protecting means to the edges of the assembled sheets and submerging such sheets in a bath of hot mercury under pressure.

15. A process of making a composite glass plate which consists in assembling the alternate sheets of glass and tough reinforcing material having their opposing surfaces prepared so as to become attached together upon the application of heat and pressure, protecting the edges of the assembled sheets by pasting strips of flexible material around such edges, and submerging such sheets in the bath of hot mercury under pressure.

In testimony whereof, I have hereunto subscribed my name this 6th day of February, 1929.

N. J. PENNING.